(12) United States Patent
Mizuguchi et al.

(10) Patent No.: US 6,310,885 B1
(45) Date of Patent: Oct. 30, 2001

(54) NETWORK SYSTEM

(75) Inventors: Yuji Mizuguchi, Kyoto; Takahisa Sakai, Amagasaki; Toshihisa Ikeda, Kyoto; Kenichi Moriguchi, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/234,636

(22) Filed: Jan. 21, 1999

(30) Foreign Application Priority Data

Jan. 23, 1998 (JP) .................................................. 10-011067

(51) Int. Cl.$^7$ .................................................. H04L 12/42
(52) U.S. Cl. ........................................... 370/450; 370/909
(58) Field of Search ..................................... 370/270, 432, 370/450, 452, 453, 456, 458, 460, 909

(56) References Cited

U.S. PATENT DOCUMENTS

| | | | |
|---|---|---|---|
| 5,886,992 | * 3/1999 | Raatikainen | 370/410 |
| 6,005,869 | 12/1999 | Sakai et al. | |
| 6,122,250 | * 9/2000 | Taniguchi | 370/222 |
| 6,202,082 | * 3/2001 | Tomizawa et al. | 709/201 |

FOREIGN PATENT DOCUMENTS

| | | | |
|---|---|---|---|
| 9-289518 | 11/1997 | (JP) . | |
| 10-004423 | 1/1998 | (JP) . | |
| 10290248-A | * 10/1998 | (JP) | H04L/12/42 |

* cited by examiner

Primary Examiner—Hassan Kizou
Assistant Examiner—Ahmed Elallam
(74) Attorney, Agent, or Firm—Wenderoth, Lind & Ponack, L.L.P.

(57) ABSTRACT

A network system comprises a main loop in which one master node which issues a token packet for data communication, and at least one slave node are connected in a loop; a first sub loop in which the master node, one sub-master node, and at least one slave node are connected in a loop; and at least one second sub loop in which the master node, at least two sub-master nodes including the sub-master node of the first sub loop, and at least one slave node are connected in a loop. In this network system, each node has an analysis execution unit which performs analysis of the token packet, control of data transmission and data reception, and a switch for changing the connection. When each node receives and analyzes the token packet, it controls the switch so as to output, transmit, or discard the token packet and a data packet. Therefore, addition of nodes and loops is facilitated while maintaining the transmission efficiency, without increasing the packet transmission time.

11 Claims, 13 Drawing Sheets

NETWORK SYSTEM

FIELD OF THE INVENTION

The present invention relates to a network system comprising one master node and at least one slave node.

BACKGROUND OF THE INVENTION

Hereinafter, a conventional network system will be described.

FIG. 13 is a block diagram illustrating a loop type network system disclosed in Japanese Published Patent Application No. Hei.9-289518. In FIG. 13, reference numeral 1301 designates a master node, numeral 1302 designates slave nodes, numeral 1303 designates a token-output/analysis-execution unit, numeral 1304 designates analysis execution units, and numerals 1305 and 1306 designate switches which disconnect the network to make connections to the token output unit and the analysis execution unit, whereby the master node 1301 and the slave nodes 1302 are connected in a loop. The switches of the respective nodes are usually placed at A to connect the network.

The master node 1301 places the switch 1305 at B to select the token-output/analysis-execution unit 1303, and issues a token packet which specifies a transmission node and a receiving node for data communication. The token packet which has made a round of the loop is discarded by the mater node 1301, and then the master node 1301 places the switch 1305 to A.

The node which is directed to transmit data by the token packet (transmission node) places the switch 1305 or 1306 at B to output a data packet. When the data packet has made a round of the loop, the node discards the data packet in itself, and returns the switch to A. On the other hand, the node which is directed to receive data by the token packet (receiving node) captures the data packet which is output to the loop-shaped network by the transmission node, into the analysis execution unit 1303 or 1304.

Data communication between the nodes is performed such that the master node successively outputs token packets.

In the above-described structure, however, since the token packet and the data packet are discarded by the nodes which have output these packets, when the number of nodes connected or the total extension of the loop is increased, the transmission time of the packet around the loop increases, resulting in a reduction in the transmission bandwidth. Further, since the node ID of one node should not be matched with the node ID of another node, management of node IDs is difficult when addition of nodes or the like is carried out.

SUMMARY OF THE INVENTION

The present invention is made to solve the above-described problems and has for its object to provide a network system in which the number of nodes connected can be increased easily without reducing the transmission bandwidth.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a network system comprising a main loop in which one master node, which issues a token packet specifying a transmission node and a receiving node for data communication using a data packet at regular intervals, and at least one slave node are connected in a loop; a first sub loop in which the master node, one sub-master node, and at least one slave node are connected in a loop; and at least one second sub loop in which the master node, at least two sub-master nodes including the sub-master node which is a component of the first sub loop, and at least one slave node are connected in a loop. In this system, the master node comprises a first analysis execution unit which performs outputting the token packet to all the loops, analysis of the token packet, control of data transmission, and data reception, and a first switch which selects one from an output of the first analysis execution unit, an input from the adjacent slave node connected in the main loop, and an input from the sub-master node which is a component of the first sub loop; the sub-master node comprises a second analysis execution unit which performs analysis of the token packet, control of data transmission, and data reception, and a second switch which selects one from an output of the second analysis execution unit, an input from the adjacent slave node connected in the self-loop, and an input from the sub-master node connected in its lower adjacent loop, and outputs it to the master or sub-master node connected in its upper adjacent loop; the slave node comprises a third analysis execution unit which performs analysis of the token packet, control of data transmission, and data reception, and a third switch which selects one from an output of the third analysis execution unit and an input from the network to the slave node; and the first switch, the second switch, and the third switch are controlled to output, transmit, and discard the token packet and the data packet.

According to a second aspect of the present invention, in the network system of the first aspect, the token packet is output from the first analysis execution unit of the master node in the state where the first switch selects the output of the first analysis execution unit, the second switch selects the input from the sub-master node connected in its lower adjacent loop, and the third switch selects the input from the network to the corresponding slave node, whereby the token packet is transmitted to all the loops.

According to a third aspect of the present invention, in the network system of the second aspect, a first specific node, which is directed to transmit data by the token packet, places the first, second, or third switch so as to select the output of the analysis execution unit of the first specific node to output a data packet, transmits the data packet through the master node to all the loops, and discards the data packet which has returned to the first specific node, in the self-node; when the first specific node belongs to the self-loop, the master node and the sub-master node place the first switch or the second switch so as to select the input from the adjacent slave node connected in the self-loop to transmit the data packet, and when the first specific node does not belong to the self-loop, the master node and the sub-master node place the first switch or the second switch so as to select the input from the slave node connected in the lower adjacent loop to discard the data packet input from the slave node connected in the self-loop, in the self-node; and a second specific node, which is directed to receive data by the token packet, receives the data packet output from the first specific node.

According to a fourth aspect of the present invention, in the network system of the third aspect, the token packet specifies either a plurality of receiving nodes or a group ID indicating a plurality of receiving nodes, whereby the corresponding plural nodes receive the same data packet.

According to a fifth aspect of the present invention, the network system of the third aspect further comprises a branch unit disposed between an output end of the master node and all the loops, the branch unit analyzing the data packet and transmitting the data packet to all the loops when the data packet is not a node ID setting packet from the master node, while transmitting the data packet to one of the loops when the data packet is a node ID setting packet from the master node. In this system, the master node, the sub-master node, and the slave node have a common initial node ID, and when the master node outputs a token packet which specifies the initial node ID for both a transmission node and a receiving node, all of the nodes having the initial node ID place their switches so as to select the outputs of their analysis execution units and, in this state, the master node outputs the node ID setting packet as a data packet, whereby only one node amongst the nodes having the initial node ID receives the node ID setting packet and sets the node ID specified by the node ID setting packet as a node ID of the self-node.

According to a sixth aspect of the present invention, in the network system of the third aspect, the master node has each output terminal to the main loop and at least one sub loop; and the master node, the sub-master node, and the slave node have a common initial node ID, and when the master node outputs a token packet which specifies the initial node ID for both a transmission node and a receiving node, all of the nodes having the initial node ID place their switches so as to select the outputs of their analysis execution units and, in this state, the master node outputs the node ID setting packet as a data packet to only one loop, whereby only one node having the initial node ID and included in the corresponding loop receives the node ID setting packet and sets the node ID specified by the node ID setting packet as a node ID of the self-node.

According to a seventh aspect of the present invention, in the network system of any of the fifth and sixth aspects, the node, which has received the node ID setting packet and set the node ID specified by the node ID setting packet as a node ID of the self-node, does not use the initial node ID as the node ID of the self-node in the subsequent communication; and the master node repeatedly outputs a token packet which specifies the initial node ID for both a transmission node and a receiving node, and a node ID setting packet, thereby specifying different node IDs for the respective nodes.

According to an eighth aspect of the present invention, in the network system of any of the fifth, sixth, and seventh aspects, the node ID includes a loop address indicating the loop in which the self-node belongs, and a node address different from those of other nodes which belong to the self-loop.

DETAILED DESCRIPTION OF THE PREFERRED EMBODIMENTS

Hereinafter, embodiments of the present invention will be described with reference to FIGS. 1 through 12.

[Embodiment 1]

Figure 1:
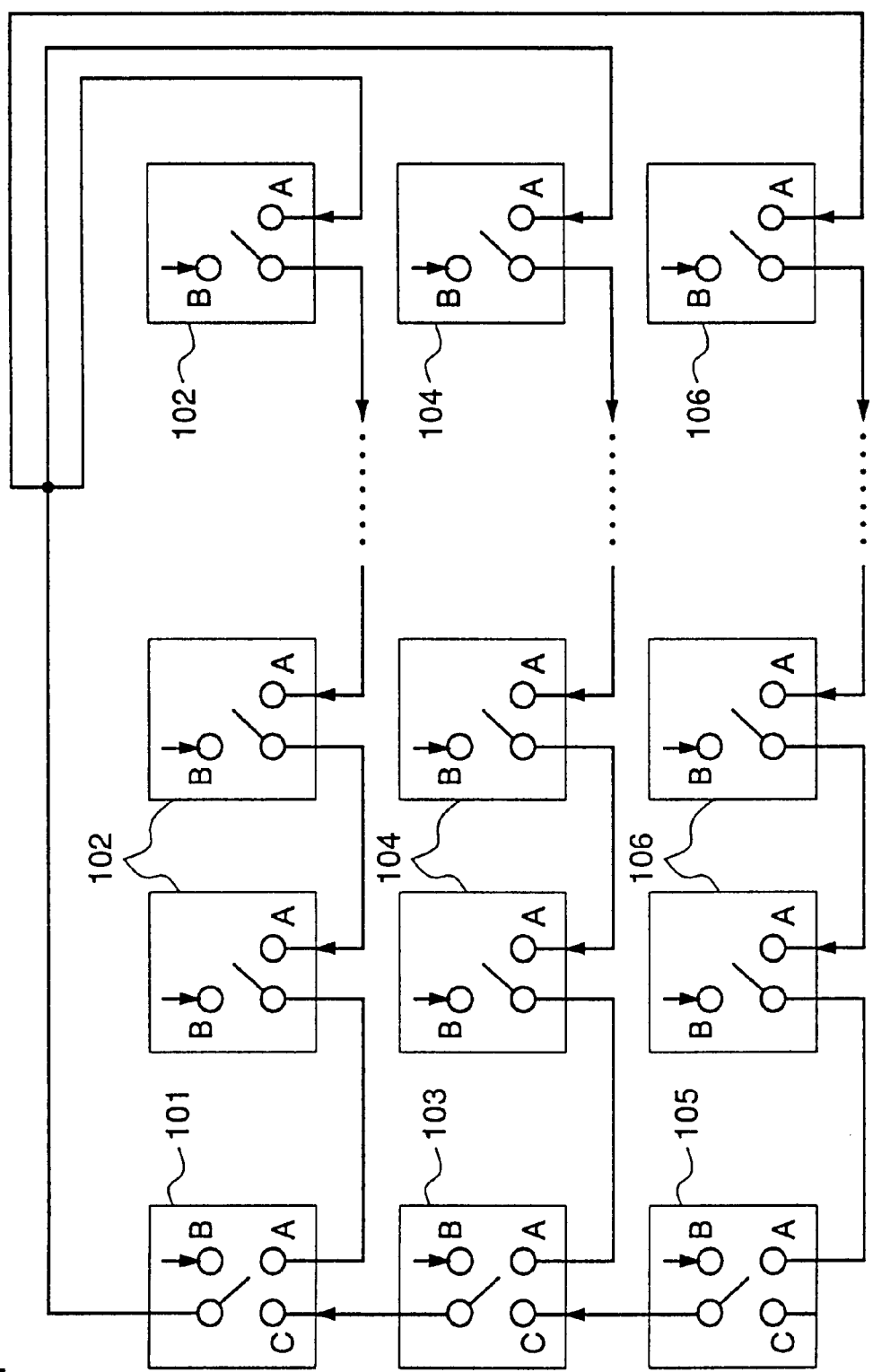
FIG. 1 is a block diagram illustrating a network system according to a first embodiment of the invention.
Figure 2:
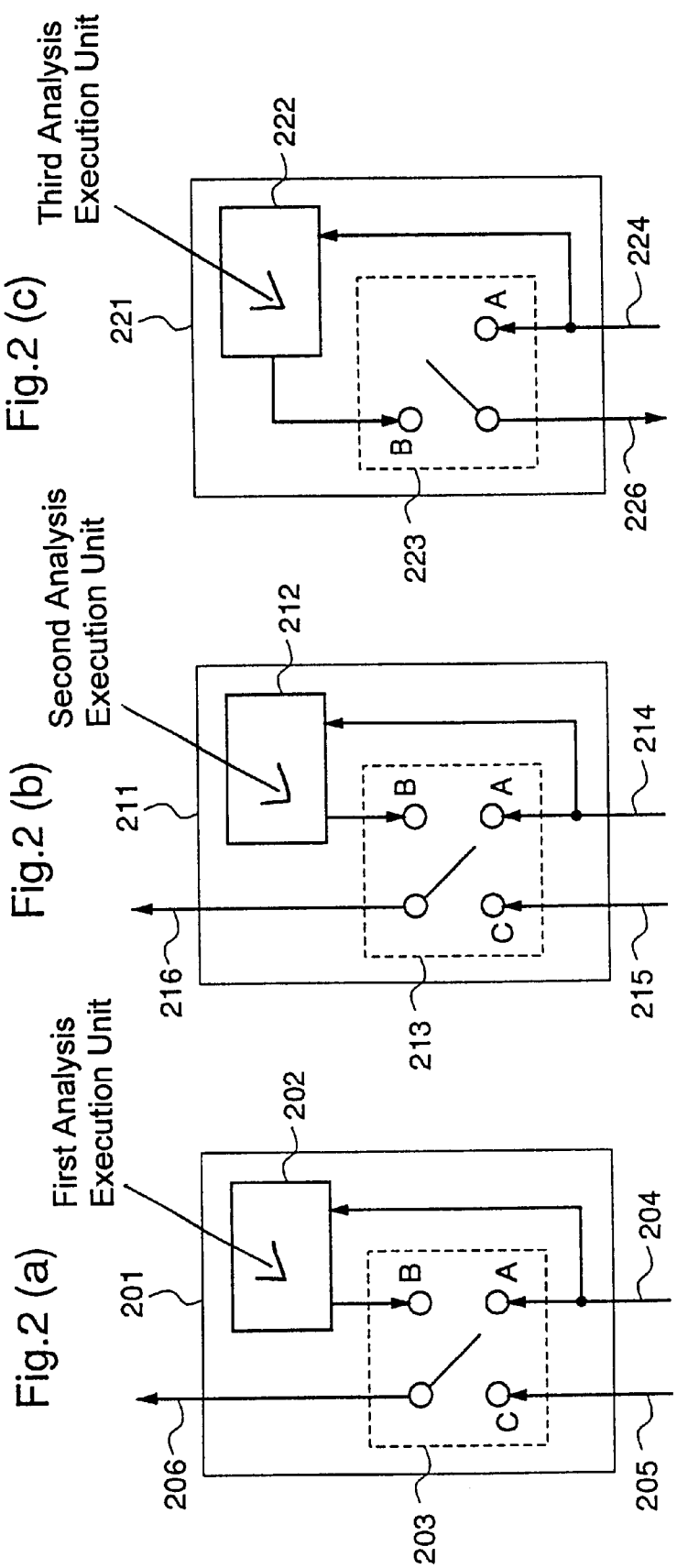
FIGS. 2(a)–2(c) are block diagrams illustrating nodes.

FIG. 1 is a block diagram illustrating a network system according to a first embodiment of the present invention. In FIG. 1, reference numeral 101 designates a master node, numerals 103 and 105 designate sub-master nodes, and numerals 102, 104, 106 designate slave nodes.

FIGS. 2(a), 2(b), and 2(c) are block diagrams illustrating the configurations of a master node 201, a sub-master node 211, and a slave node 221, respectively.

As shown in FIG. 2(a), the master node 201 comprises a first analysis execution unit 202 and a first switch 203. The first analysis execution unit 202 performs outputting a token packet, analysis of the token packet, control of data transmisson, and data reception. The first switch 203 selects one from the input from the first analysis execution unit 202, the input from the main loop (self-loop), and the input from the sub-master node which is connected in the lower loop. Reference numeral 204 designates an input terminal from the self-loop, numeral 205 designates an input terminal from the lower loop, and numeral 206 designates an output terminal.

Turning to FIG. 2(b), the sub-master node 211 comprises a second analysis execution unit 212 and a second switch 213. The second analysis execution unit 212 performs analysis of token packets, control of data transmission, and data reception. The second switch 213 selects one from the input from the second analysis execution unit 212, the input from the self-loop, and the input from the lower sub loop, and outputs it to the master node 201 or another sub-master node connected in the upper loop. Reference numeral 214 designates an input terminal from the self-loop, numeral 215 designates an input terminal from the lower loop, and numeral 216 designates an output terminal to the upper loop.

Turning to FIG. 2(c), the slave node 221 comprises a third analysis execution unit 222 and a third switch 223. The third analysis execution unit 222 performs analysis of token packets, control of data transmission, and data reception. The third switch 223 disconnects the network to make a connection to the third analysis execution unit 222. Reference numeral 224 designates an input terminal from the network, and numeral 226 designates an output terminal to the network.

As shown in FIG. 1, the network system comprises a main loop in which one master node 101 and at least one slave node 102 are connected, and at least a sub loop in which one sub-master node 103 (105) and at least one slave node 104 (106) are connected. A token packet specifying a transmission node and a receiving node is output from the master node 101 to all the loops (nodes) at predetermined time intervals.

A description is given of the operation of the network system so constructed.

Figure 3:
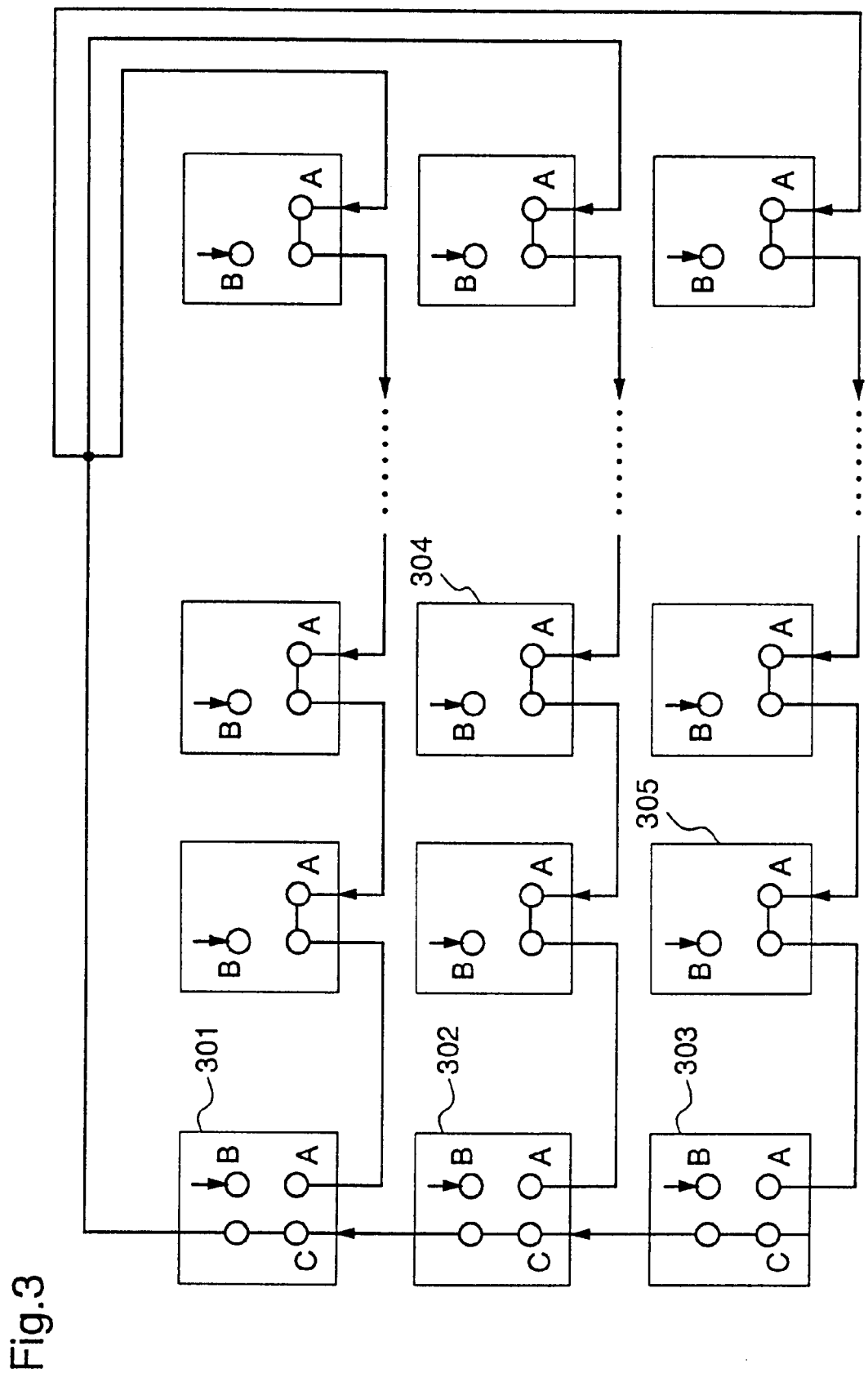
FIG. 3 is a block diagram illustrating the initial states of switches of the respective nodes.

FIG. 3 is a diagram illustrating the initial states of the switches of the respective nodes. The first switch 203 of the master node 301 and the second switches 213 of the sub-master nodes 302 and 303 are placed at C to output the inputs from the lower loops, and the third switches 223 of all the slave nodes are placed at A to connect the network. As an example, the case of transmitting a data packet from the slave node 304 to the slave node 305, will be described.

Figure 4:
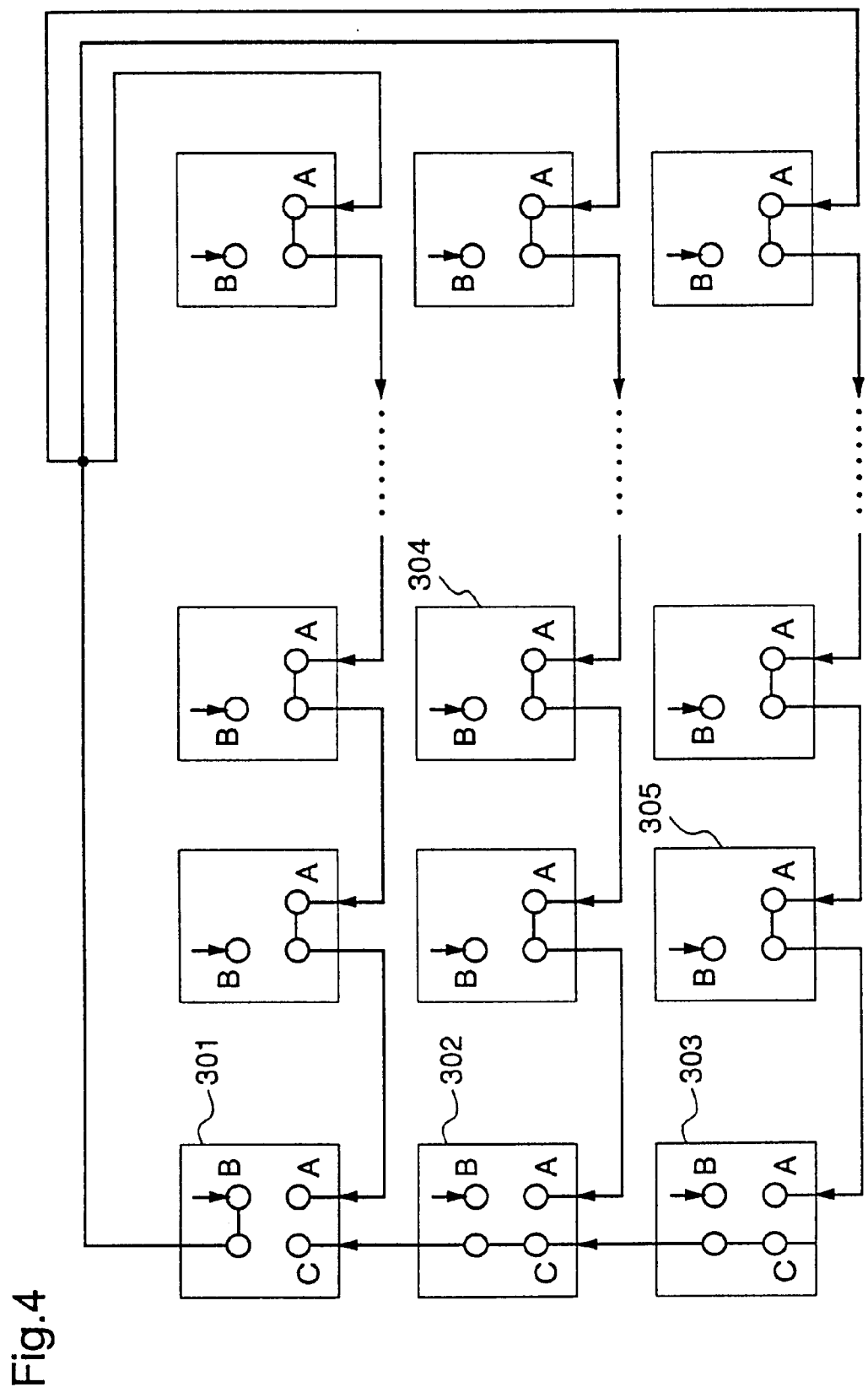
FIG. 4 is a block diagram illustrating the transmission and discarding of token packets.

FIG. 4 is a diagram illustrating the transmission and discarding of a token packet. Initially, the master node 301 places the first switch 203 at B to select the first analysis-execution unit 202, and issues a token packet specifying a transmission node (slave node 304) and a receiving node (slave node 305) to all the loops simultaneously. The token packet is received by the third analysis execution units 222 of the respective slave nodes to be transmitted. In the main loop, the token packet is received by the first analysis execution unit 202 of the master node 301 and then discarded. In the sub loop, the token packet is received by the second analysis execution unit 212 of the sub-master node 302 (303) and then discarded.

Figure 5:
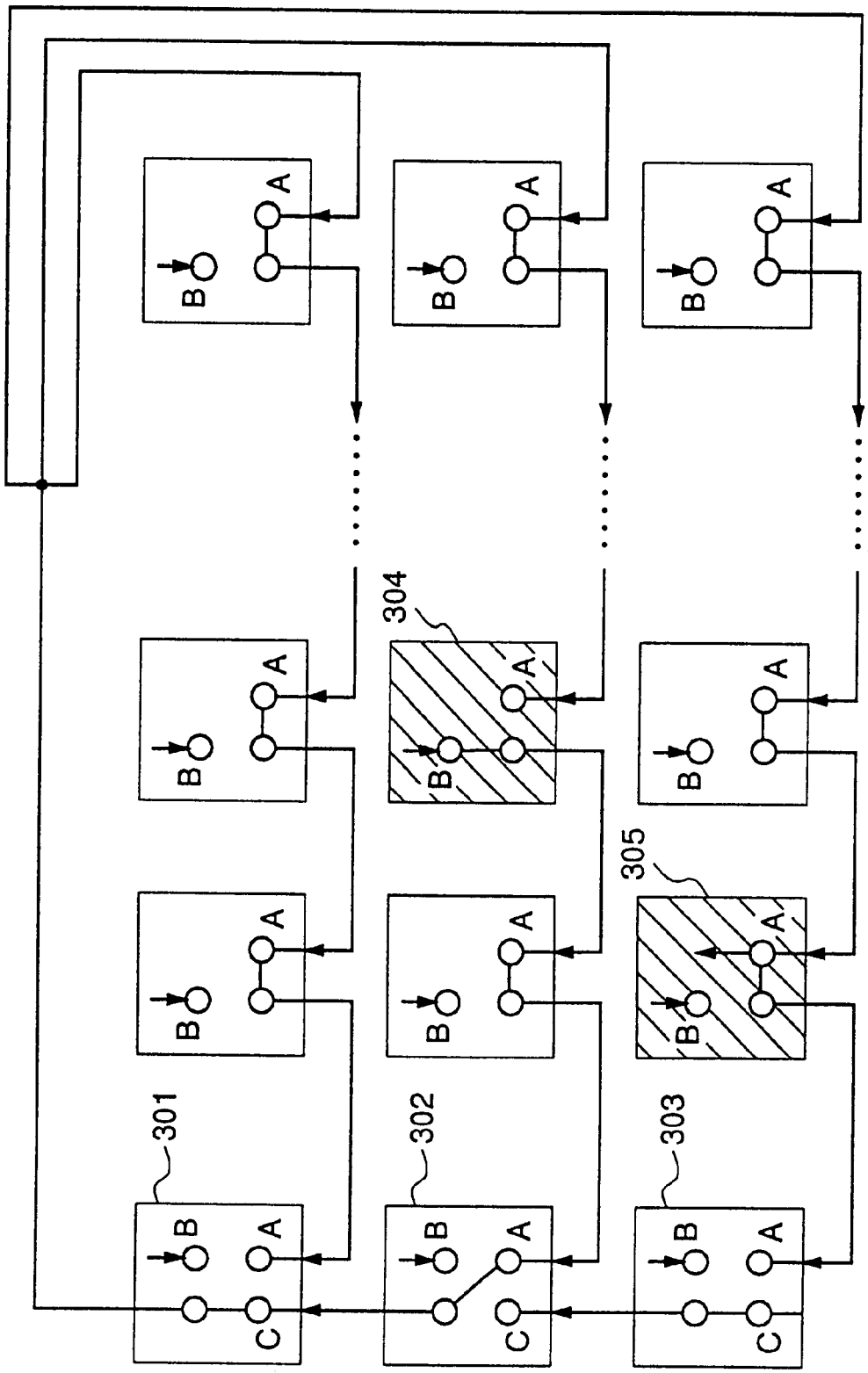
FIG. 5 is a block diagram illustrating the transmission and discarding of data packets.

FIG. 5 is a diagram illustrating the transmission and discarding of a data packet. The slave node 304, which is directed to transmit a data packet by the token packet, places the third switch 223 at B to disconnect the network and select the analysis execution unit 222, and outputs a data packet. The master node 301 or the sub-master node 302 (303) places the first switch 203 or the second switch 213 at A to select the self-loop only when the transmission node exists in the self-loop. In this case, the sub-master node 302 corresponds to the node having the transmission node in the self-loop. The data packet output from the slave node 304 is transmitted through the sub-master node 302 and the master node 301 to all the loops. When the data packet output from the slave node 304 has returned to the self-node (slave node 304), the slave node 304 discards the data packet and places the third switch 223 to the initial state. When the data packet has passed through the sub-master node 302, the sub-master node 302 places the second switch 213 to the initial state. The master node 301 and the sub-master node 303 discard the data packets received by the self-nodes, and set the first switch 203 and the second switch 213 to the initial states, respectively, to receive the next token packet. Although the data packet is transmitted to all the nodes, only the node 305 specified by the token packet receives the data packet at the analysis execution unit 222.

Since the data packet is transmitted to all the nodes, when a plurality of receiving nodes or a group ID indicating a plurality of receiving nodes are/is specified by the token packet, the data packet can be received by the corresponding receiving nodes.

Further, while in this first embodiment the slave nodes 304 and 305 are specified as a transmission node and a receiving node by the token packet, respectively, even when the master node or the sub-master node is specified, transmission and receiving of a data packet is carried out in similar manner.

As described above, according to the first embodiment of the present invention, a network system comprises a main loop in which one master node and at least one slave node are connected, and at least one sub loop in which one sub-master node and at least one slave node are connected. The output from the sub-master node is connected to the upper sub-master node or the master node, and switches of the master node, the sub-master node, and the slave node are controlled to output, transmit, and discard a token packet and a data packet. Therefore, it is possible to add nodes and loops while maintaining the transmission efficiency, without increasing the packet transmission time.

[Embodiment 2]

Figure 6:
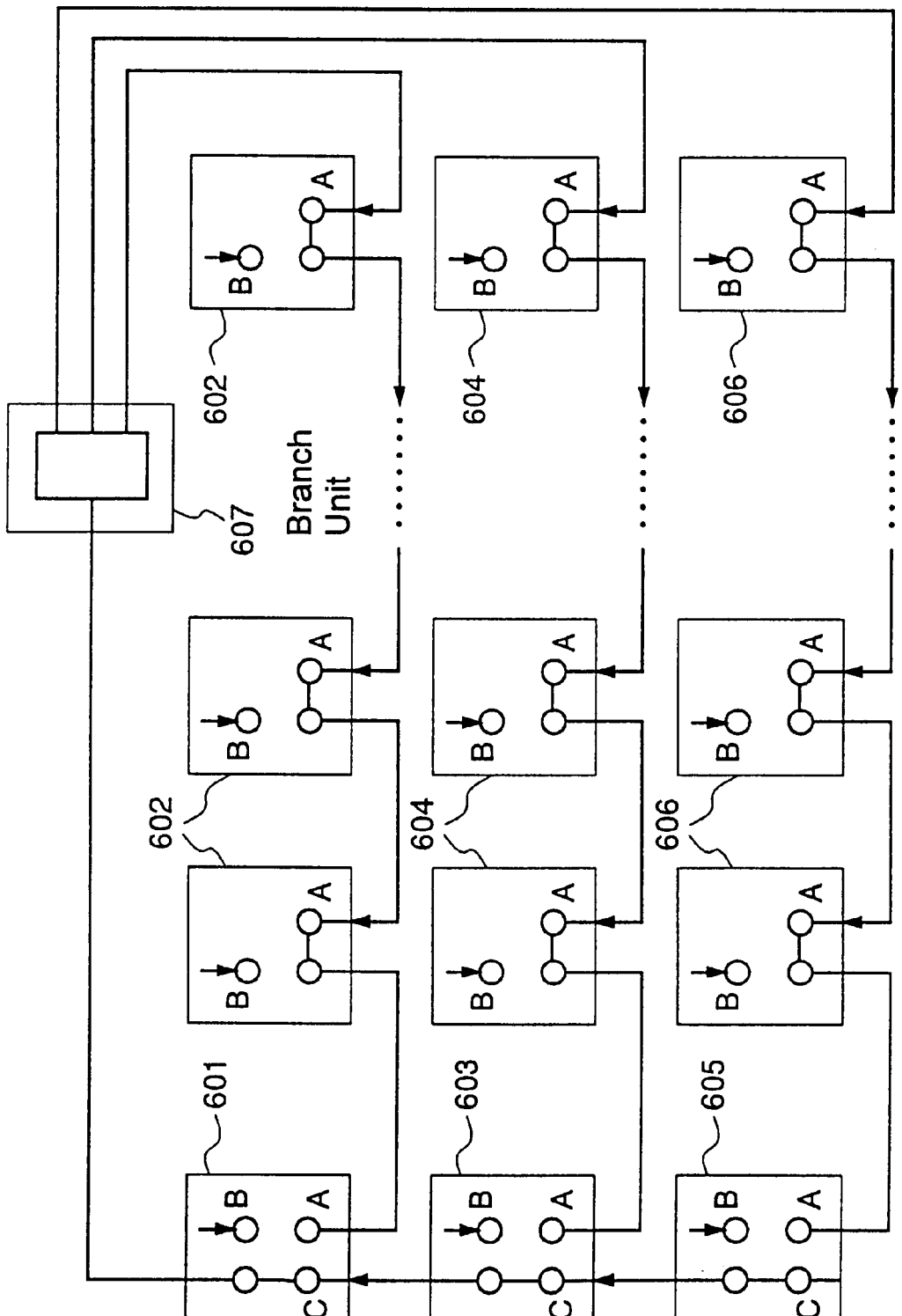
FIG. 6 is a block diagram illustrating a network system according to a second embodiment of the invention.

FIG. 6 is a block diagram illustrating a network system according to a second embodiment of the present invention. In FIG. 6, reference numeral 601 designates a master node, numerals 603 and 605 designate sub-master nodes, numerals 602, 604, 606 designate slave nodes, and numeral 607 designates a branch unit.

Figure 7:
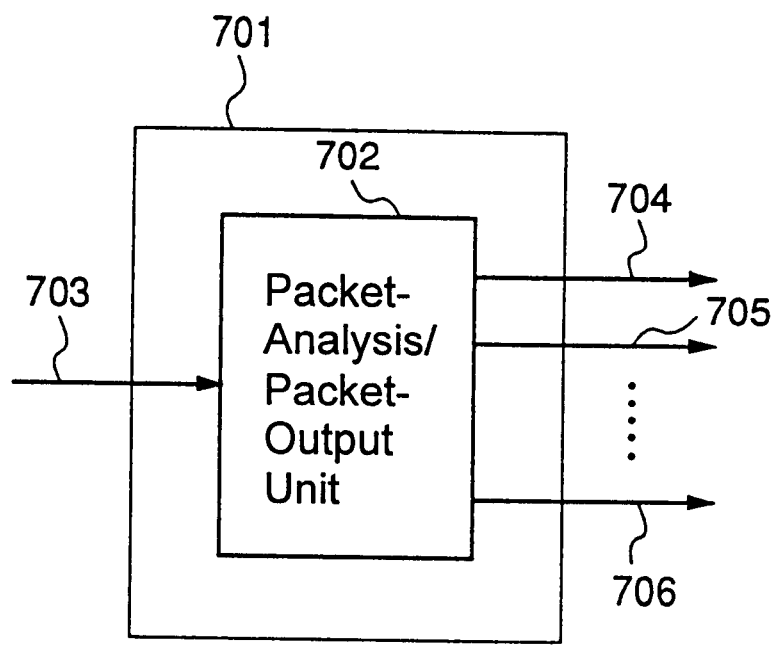
FIG. 7 is a block diagram illustrating a branch unit.

FIG. 7 shows the configuration of the branch unit. In FIG. 7, reference numeral 701 designates a branch unit, numeral 702 designates a packet-analysis/packet-output unit, numeral 703 designates an input terminal from the master node, numeral 704 designates an output terminal to the main loop, and numerals 705 and 706 designate output terminals to the sub loops.

As shown in FIG. 6, the network comprises a main loop in which one master node 601 and at least one slave node 602 are connected, at least one sub loop in which one sub-master node 603 (605) and at least one slave node 604 (606) are connected, and the branch unit 607.

The configurations of the master node, the sub-master node, and the slave node are identical to those already described for the first embodiment.

A token packet is output from the master node 601 to all the loops at predetermined time intervals.

It is assumed that the respective nodes have a common initial node ID. For example, this initial node ID is stored in a nonvolatile memory or the like, and it is read from the memory after the power is applied.

Hereinafter, a description is given of the operation of the network system so constructed.

The initial states of the switches of the respective nodes are as shown in FIG. 6. The first switch of the master node 601 and the second switches of the sub-master nodes 603 and 605 are placed at C to output the input from the lower loop, and the third switches of all the slave nodes 602, 604, and 606 are placed at A to connect the network.

In this second embodiment, the procedure of outputting, transmitting, and discarding the packets other than a switching token packet and a node ID setting packet is identical to that already described for the first embodiment. The switching token packet is a kind of a token packet, which specifies nodes having the initial node ID as a transmission node and a receiving node. The node ID setting packet is a kind of a data packet. In this second embodiment, as an example, the case of setting the node ID of a node in a main loop, will be described.

Figure 9:
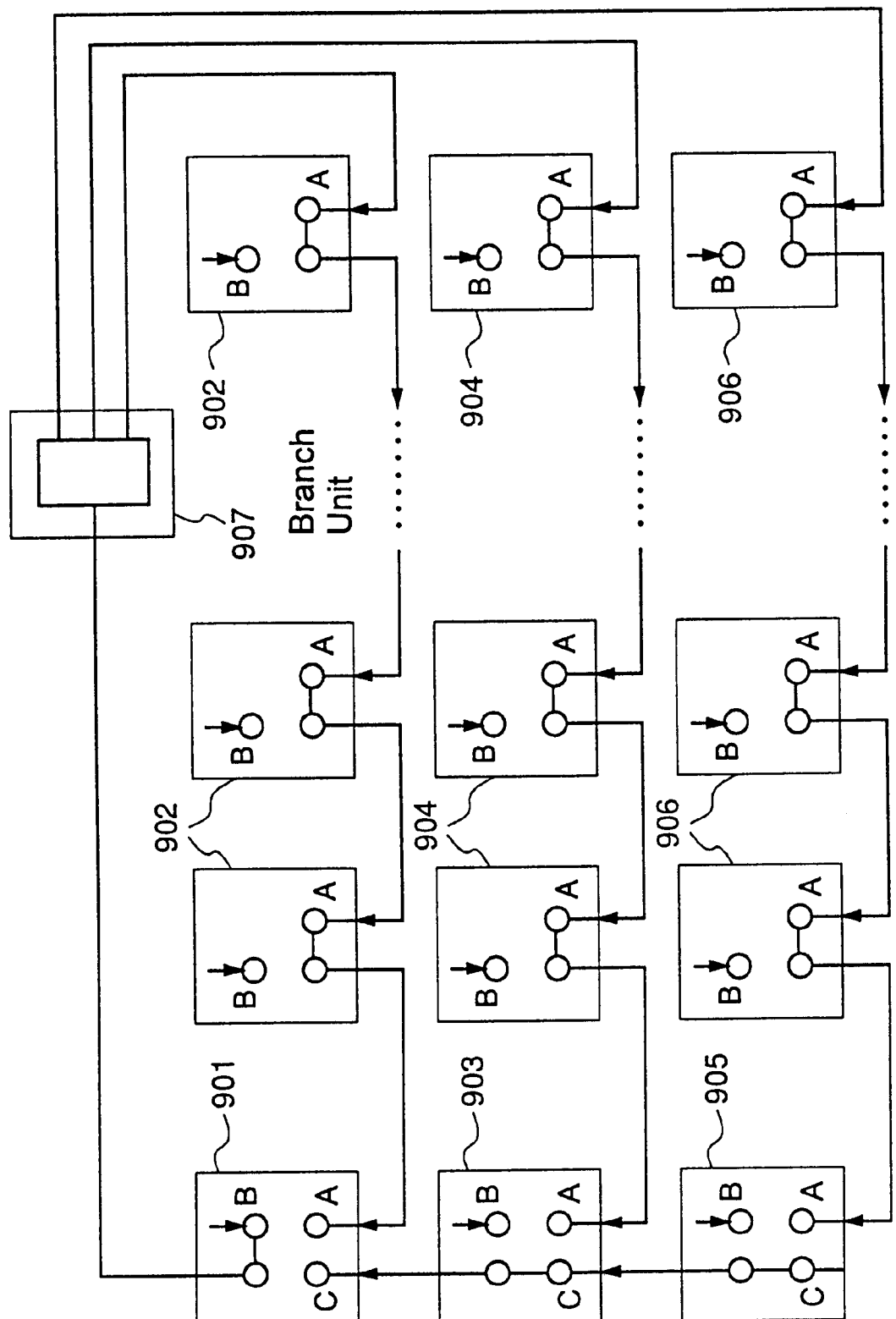
FIG. 9 is a block diagram illustrating the transmission and discarding of switching token packets.

FIG. 9 is a diagram illustrating transmission and discard of a switching token packet. In FIG. 9, a master node 901 is identical to the master node 201. First of all, the master node 901 places the first switch 203 at B to select the first analysis execution unit 202, and issues a switching token packet to the branch unit 907. The branch unit 907 analyzes all the packets which have arrived thereat, and transmits all of the packets other than the node ID setting packet, to the loops connected thereto.

The switching token packet output from the branch unit 907 is received by the third analysis execution unit 222 of each slave node to be transmitted. In the main loop, the switching token packet is received by the first analysis execution unit 202 of the master node 901 and then discarded. In the sub loop, it is received by the second analysis execution unit 212 of the sub-master node and then discarded.

Figure 10:
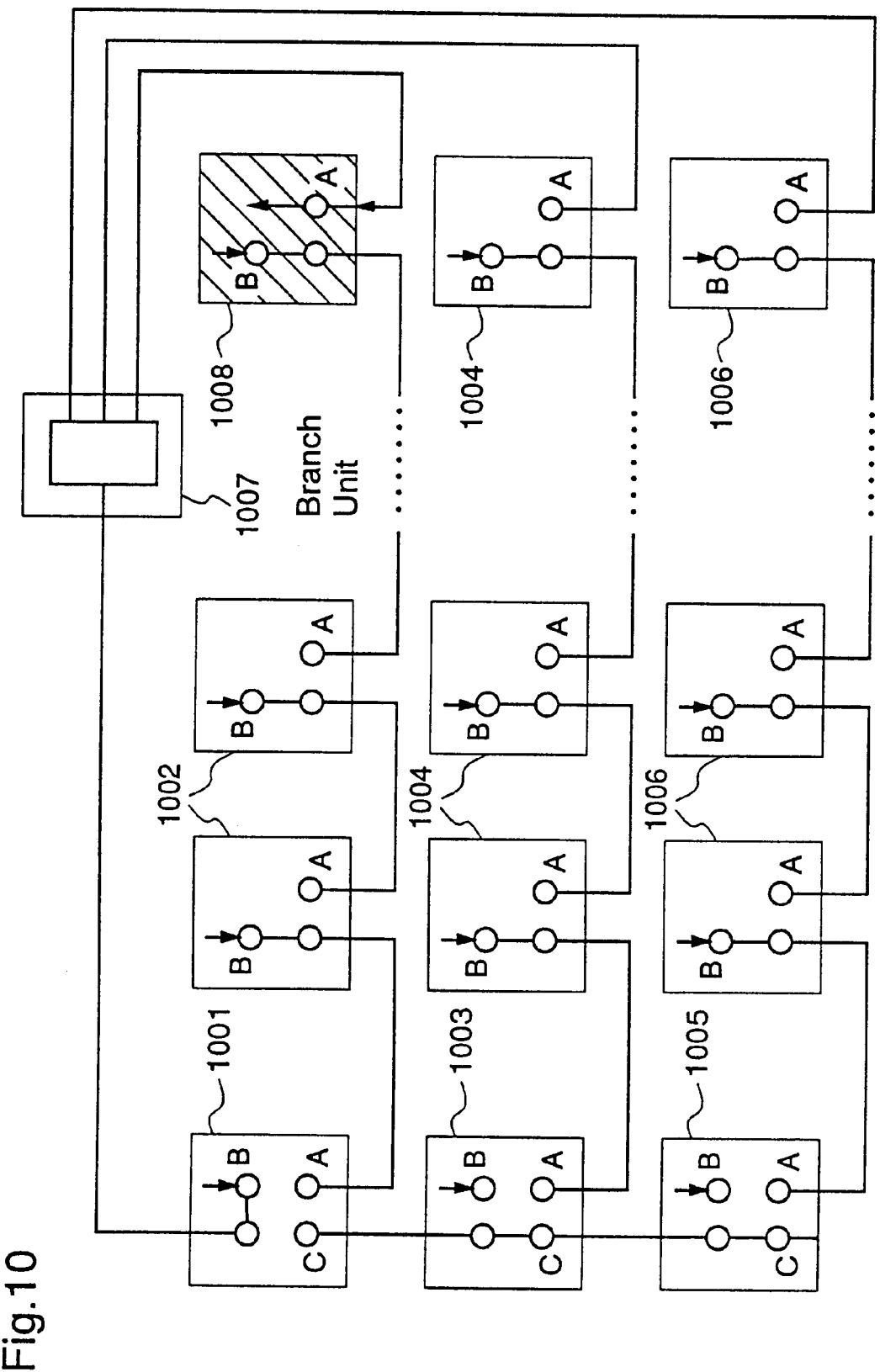
FIG. 10 is a block diagram illustrating the transmission of node ID setting packets.

FIG. 10 is a diagram illustrating transmission of a node ID setting packet. Each of the slave nodes 1002, 1004, 1006 and 1008 having the initial node ID, which receives the switching token packet and is directed to transmit/receive the data packet, places the third switch 223 at B to disconnect the network and select the third analysis execution unit 222. Further, each of the sub-master nodes 1003 and 1005 having the initial node ID, which receives the switching token packet and is directed to transmit/receive the data packet, places the second switch 213 at C to select the input terminal 215 from the lower loop. Further, the master node 1001 having the initial node ID, which receives the switching token packet and is directed to transmit/receive the data packet, places the first switch 203 at B to select the analysis execution unit 202. At this time, the master node 1001 observes the input from the input terminal 205 from the lower loop. The slave nodes 1002, 1004, 1006 and 1008 are identical to the slave node 221, the sub-master nodes 1003 and 1005 are identical to the sub-master node 211, and the master node 1001 is identical to the master node 201.

The master node 1001 places the first switch 203 to select the first analysis execution unit 202 and then outputs the node ID setting packet as a data packet.

The branch unit 1007 analyzes the packet from the master node 1001. When the packet is the node ID setting packet, the branch unit 1007 sends it to only one loop (in this case, the main loop).

The node ID setting packet output from the branch unit 1007 is received by the slave node 1008, and the node ID of the slave node 1008 is set. Since the third switch of the slave node 1008 is placed on B to disconnect the network, the node ID setting packet does not reach the slave nodes 1002 in the main loop. Further, the node ID setting packet does not reach the loops other than the main loop in which node ID setting is currently carried out, i.e., the slave nodes 1004 and 1006 and the sub-mater nodes 1003 and 1005 in the sub loops.

Further, the nodes other than the master node which has received the switching token packet (i.e., all of the slave nodes and sub-master nodes) do not output data packets. All of the nodes set their switches in the initial states when a predetermined time has passed from the receipt of the token packet, for transmission and receiving of the next token packet.

Then, the master node 1001 again places the first switch 203 at B to select the first analysis execution unit, and issues a switching token packet to the branch unit. As described above, the branch unit analyzes the packet and outputs it to all the loops. The switching token packet is received by all the nodes. However, since the node ID other than the initial ID has already been set in the slave node 1008 as shown in FIG. 10, the slave node 1008 does not perform switching.

Figure 11:
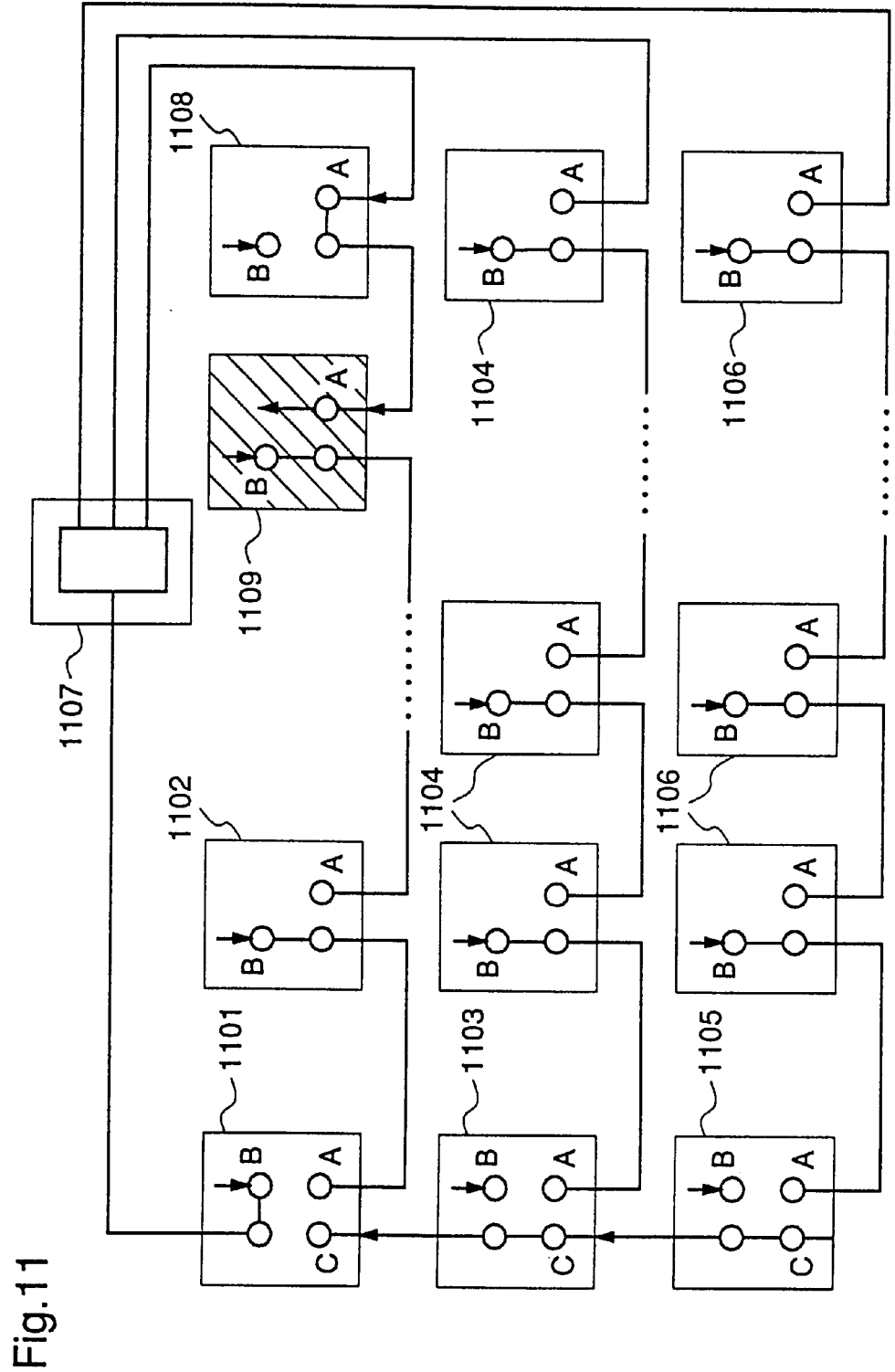
FIG. 11 is a block diagram illustrating the second time transmission of node ID setting packets.

FIG. 11 is a diagram illustrating the second transmission of a node ID setting packet. The nodes other than the slave node 1108 whose node ID has already been set, perfrom switching as described above.

The master node 1101 is identical to the master node 201, and it outputs a node ID setting packet from the first analysis execution unit 202.

The branch unit 1107 analyzes the packet from the master node. Since the packet is the node ID setting packet, the branch unit 1107 sends it to the main loop alone.

The node ID setting packet from the branch unit 1107 is received by the slave node 1109, wherein the node ID of the slave node 1109 is set. Since the third switch of the slave node 1109 is placed at B to disconnect the network, the node ID setting packet is discarded in the slave node 1109.

The respective nodes set their switches in the initial states for receiving the next token packet.

Figure 12:
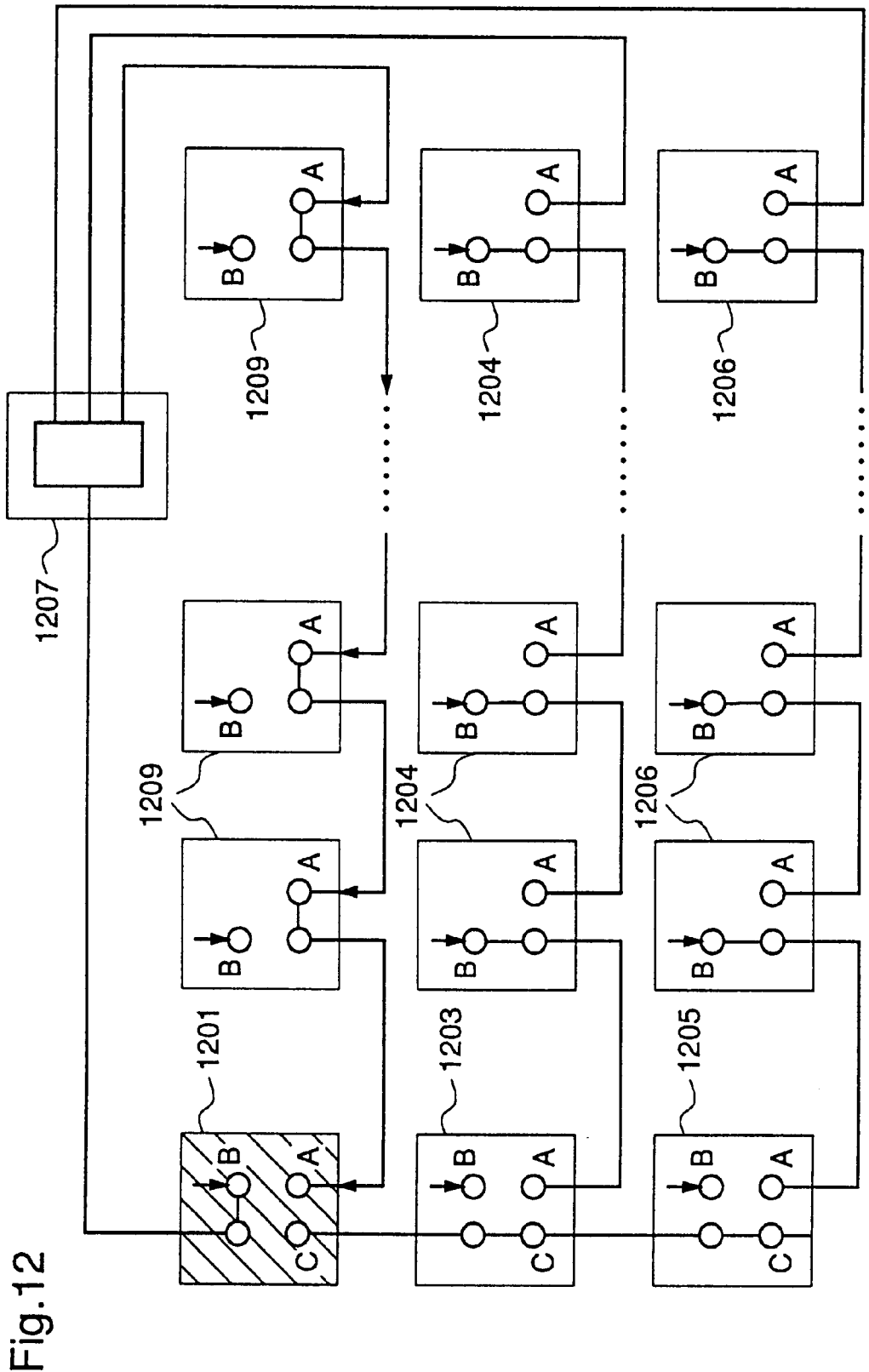
FIG. 12 is a block diagram illustrating N-th time transmission of node ID setting packets.
Figure 13:
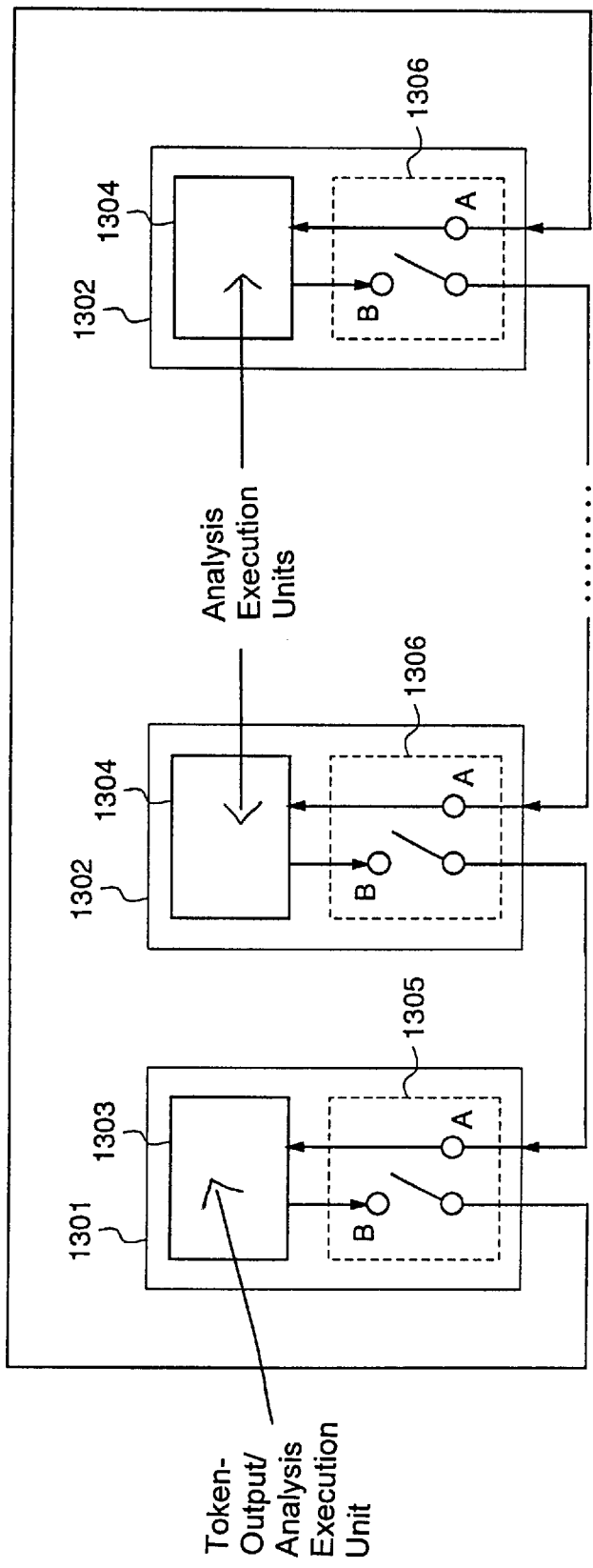
FIG. 13 is a block diagram illustrating a network system according to the prior art.

Thereafter, the node IDs of the nodes in the main loop are successively set in a similar manner. In setting of the N-th node ID (N: the number of nodes connected to the loop in which node ID setting is currently carried out), the node ID setting packet returns to the master node 1201 as shown in FIG. 12. When the node ID setting packet has returned to the master node 1201; the master node 1201 sets its own node ID, whereby setting of node IDs of the nodes connected to the main loop is completed and, simultaneously, the operation enters setting of node IDs of the nodes connected to the next sub loop.

On receipt of a node ID setting packet for the next loop, the branch unit 1107 knows that the loop to be subjected to node ID setting has changed, and changes the loop to which the node ID setting packet should be sent, to a loop in which node ID setting has not been completed yet.

As setting of node IDs proceeds in similar manner, in setting of the N-th node ID (N: the number of nodes connected to the loop in which node ID setting is currently carried out), the node ID setting packet is sent to the sub-master node. On receipt of the node ID setting packet, the sub-master node sets the node ID. Then, the sub-master node receives the next switching token packet, and places the second switch of the self node at A to select the input terminal 214 from the self-loop. Thereby, the next (N+1-th) node ID setting packet is received by the master node to be discarded. The sub-master nodes 1203 and 1205 are identical to the sub-master node 211.

When the master nodes receives the node ID setting packet while setting the node ID of the node outside the self-loop, the master node recognizes that setting of node IDs of all the nodes, which are connected to the loop in which node ID setting is currently carried out, has been completed, and proceeds to setting of node IDs for the next loop.

However, the sub-master node places the second switch at A to make a connection to the input terminal 214 from the self-loop, for only one time in the cycle next to receiving the node ID setting packet. Thereafter, on receipt of the switching token packet, the sub-master node whose node ID has already been set places the switch at C to make a connection to the input terminal 215 from the lower loop. Thereby, in the following setting of node IDs for the lower loop, a node ID setting packet which indicates completion of setting of node IDs of the nodes connected to this loop can be transmitted to the master node.

Thereafter, the node IDs of all the nodes in the network are set in a similar manner.

A node ID comprises a loop address indicating a loop in which the corresponding node belongs, and a node address which does not match with those of other nodes belonging in the corresponding loop.

Further, the order of the loops to be subjected to node ID setting is not restricted to that described above, and it is needless to say that node ID setting can be carried out in an arbitrary order.

Figure 8:
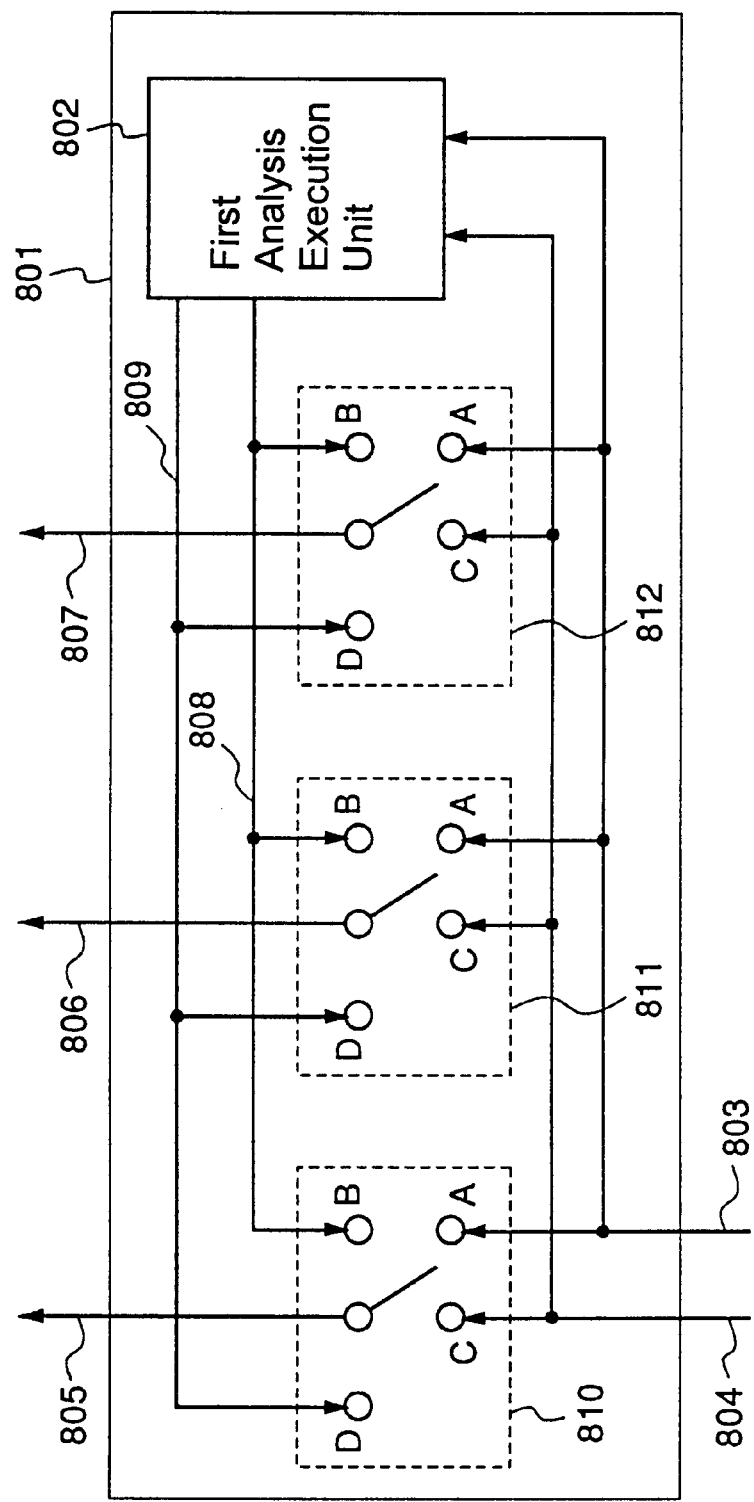
FIG. 8 is a block diagram illustrating a master node having a plurality of output ports.

Further, in place of the branch unit, a master node having a plurality of output ports may be employed as shown in FIG. 8.

In FIG. 8, reference numeral 801 designates a master node which has output terminals 805~807 to the respective loops. Reference numeral 802 designates a first analysis execution unit which performs outputting a token packet, analysis of the token packet, control of data transmission, and data reception. Reference numeral 803 designates an input terminal from the main loop, numeral 804 designates an input terminal from the sub-master node connected in the lower loop, numeral 805 designates an output terminal to the main loop, numerals 806 and 807 designate output terminals to the sub loops, numeral 809 designates an output port for node ID setting packets, numeral 808 designates an output port for usual packets (packets other than node ID setting packets), and numeral 810~812 designate switches each having a position D to send a node ID setting packet to a specific loop.

When the master node 801 outputs a usual packet, it places all of the switches 810~812 at B to select the usual packet output port 808 of the first analysis execution unit 802. When transmitting a data packet of a node connected to the self-loop, the master node 801 places all the switches 810~812 at A to select the input terminal from the main loop. When transmitting a data packet of a node connected to a lower loop, the master node 801 places all the switches 810~812 at C to select the input terminal from the lower loop.

When performing node ID setting, initially, the master node 801 places all the switches 810~812 at B to select the usual packet output port 808 of the analysis execution unit 802, and issues a switching token packet (a token packet specifying nodes having the initial node ID, as a transmission node and a receiving node) to all the loops. Then, the second switch of the sub-master node having the initial node ID and the third switch of the slave node having the initial node ID are placed at B to select the second analysis execution unit and the third analysis execution unit, respectively. Thereafter, the master node 801 places one of the switches 810~812, which has an output to a loop to be subjected to node ID setting, at D to select the node ID setting packet output port, and issues a node ID setting packet to only one loop. Amongst the nodes having the initial node ID, only one node receives the node ID setting packet output from the master node 801, and sets the node ID of the self-node. The master node 801 repeats this operation to set the node IDs of all the nodes.

As described above, in a network system comprising a main loop in which one master node and at least one slave node are connected and at least one sub loop in which one sub-master node and at least one slave node are connected, the master node, the sub-master nodes, and the slave nodes have the same initial node ID, and the master node outputs a token packet, which specifies the initial node ID for both a transmission node and a receiving node, and a node ID setting packet as a data packet, to only one loop. The master node repeats the output of the token packet and the node ID setting packet, whereby the respective nodes are given different node IDs. Therefor, the node IDs of the respective nodes can be automatically set when the system is booted, e.g., when the power is applied.

What is claimed is:

1. A network system comprising:
   a main loop in which one master node which issues a token packet specifying a transmission node, a receiving node for data communication using a data packet at regular intervals, and at least one slave node are connected in a loop;
   a first sub loop in which said master node, one sub-master node, and at least one slave node are connected in a loop; and
   at least one second sub loop in which said master node, at least two sub-master nodes including said sub-master node which is a component of said first sub loop, and at least one slave node are connected in a loop;
   wherein said master node comprises a first analysis execution unit which performs outputting the token packet to all the loops, analysis of the token packet, control of data transmission and data reception, and a first switch which selects one from an output of said first analysis execution unit, an input from the adjacent slave node connected in said main loop, and an input from said sub-master node which is a component of said first sub loop;
   wherein said sub-master node comprises a second analysis execution unit which performs analysis of the token packet, control of data transmission and data reception, and a second switch which selects one from an output of said second analysis execution unit, an input from the adjacent slave node connected in the self-loop, and an input from said sub-master node connected in its lower adjacent loop, and outputs it to said master or sub-master node connected in its upper adjacent loop;
   wherein said slave node comprises a third analysis execution unit which performs analysis of the token packet, control of data transmission and data reception, and a third switch which selects one from an output of said third analysis execution unit and an input from the network to said slave node; and
   said first switch, said second switch, and said third switch are controlled to output, transmit, and discard the token packet and the data packet.

2. The network system of claim 1, wherein the token packet is output from said first analysis execution unit of said master node in the state where said first switch selects the output of said first analysis execution unit, said second switch selects the input from said sub-master node connected in its lower adjacent loop, and said third switch selects the input from the network to the corresponding slave node, whereby the token packet is transmitted to all the loops.

3. The network system of claim 2, wherein:
   a first specific node, which is directed to transmit data by the token packet, places said first, second, or third switch so as to select the output of said analysis execution unit of said first specific node to output a data packet, transmits the data packet through said master node to all the loops, and discards the data packet which has returned to said first specific node, in the self-node;
   when said first specific node belongs to the self-loop, said master node and said sub-master node place said first switch or said second switch so as to select the input from the adjacent slave node connected in the self-loop to transmit the data packet, and when said first specific node does not belong to the self-loop, said master node and said sub-master node place said first switch or said second switch so as to select the input from said slave node connected in the lower adjacent loop to discard the data packet input from said slave node connected in the self-loop, in the self-node; and
   a second specific node, which is directed to receive data by the token packet, receives the data packet output from said first specific node.

4. The network system of claim 3, wherein the token packet specifies either a plurality of receiving nodes or a group ID indicating a plurality of receiving nodes, whereby the corresponding plural nodes receive the same data packet.

5. The network system of claim 3, further comprising a branch unit disposed between an output end of said master node and all the loops, said branch unit analyzing the data packet and transmitting the data packet to all the loops when the data packet is not a node ID setting packet from said master node, while transmitting the data packet to one of the loops when the data packet is a node ID setting packet from said master node;

wherein said master node, said sub-master node, and said slave node have a common initial node ID, and when said master node outputs a token packet which specifies the initial node ID for both a transmission node and a receiving node, all of the nodes having the initial node ID place their switches so as to select the outputs of their analysis execution units and, in this state, said master node outputs the node ID setting packet as a data packet, whereby only one node amongst the nodes having the initial node ID receives the node ID setting packet and sets the node ID specified by the node ID setting packet as a node ID of the self-node.

6. The network system of claim 3, wherein:

said master node has each output terminal to the main loop and at least one sub loop; and said master node, said sub-master node, and said slave node have a common initial code ID, and when said master node outputs a token packet which specifies the initial node ID for both a transmission node and a receiving node, all of the nodes having the initial node ID place their switches so as to select the outputs of their analysis execution units and, in this state, said master node outputs the node ID setting packet as a data packet to only one loop, whereby only one node having the initial node ID and included in the corresponding loop receives the node ID setting packet and sets the node ID specified by the node ID setting packet as a node ID of the self-node.

7. The network system of claim 5, wherein:

the node, which has received the node ID setting packet and sets the node ID specified by the node ID setting packet as a node ID of the self-node, does not use the initial node ID as the node ID of the self-node in the subsequent communication; and said master node repeatedly outputs a token packet which specifies the initial node ID for both a transmission node and a receiving node, and a node ID setting packet, thereby specifying different node IDs for the respective nodes.

8. The network system of claim 6, wherein:

the node, which has received the node ID setting packet and sets the node ID specified by the node ID setting packet as a node ID of the self-node, does not use the initial node ID as the node ID of the self-node in the subsequent communicaton; and said master node repeatedly outputs a token packet which specifies the initial node ID for both a transmission node and a receiving node, and a node ID setting packet, thereby specifying different node IDs for the respective nodes.

9. The network system of claim 5, wherein the node ID includes a loop address indicating the loop in which the self-node belongs, and a node address different from those of other nodes which belongs to the self-loop.

10. The network system of claim 6, wherein the node ID includes a loop address indicating the loop in which the self-node belongs, and a node address different from those of other nodes which belong to the self-loop.

11. The network system of claim 7, wherein the node ID includes a loop address indicating the loop in which the self-node belongs, and a node address different from those of other nodes which belong to the self-loop.

* * * * *